(12) United States Patent
Jesurajan Marystella et al.

(10) Patent No.: US 12,423,204 B2
(45) Date of Patent: Sep. 23, 2025

(54) SYSTEMS AND METHODS TO ABSTRACT HARDWARE ACCESS IN BASEBOARD MANAGEMENT CONTROLLERS (BMCS)

(71) Applicant: Dell Products, L.P., Round Rock, TX (US)

(72) Inventors: Anto DolphinJose Jesurajan Marystella, Round Rock, TX (US); Tyler Nardecchia, Cedar Park, TX (US); Arun Muthaiyan, Round Rock, TX (US); Sunil Kumar Gattu, Leander, TX (US); Hasibul Hasan, Iowa City, IA (US)

(73) Assignee: Dell Products, L.P., Round Rock, TX (US)

( * ) Notice: Subject to any disclaimer, the term of this patent is extended or adjusted under 35 U.S.C. 154(b) by 174 days.

(21) Appl. No.: 18/493,975

(22) Filed: Oct. 25, 2023

(65) Prior Publication Data
US 2025/0138968 A1    May 1, 2025

(51) Int. Cl.
*G06F 11/30* (2006.01)
*G06F 13/42* (2006.01)

(52) U.S. Cl.
CPC .......... *G06F 11/3058* (2013.01); *G06F 13/42* (2013.01)

(58) Field of Classification Search
CPC .............................. G06F 11/3058; G06F 13/42
USPC ....................................................... 713/300
See application file for complete search history.

(56) References Cited

U.S. PATENT DOCUMENTS

| | | | |
|---|---|---|---|
| 6,209,037 B1 * | 3/2001 | Brown ................. | G05B 19/408 700/19 |
| 10,924,350 B1 * | 2/2021 | Kaminski ............... | H04L 43/08 |
| 2002/0083131 A1 * | 6/2002 | Machida ............... | G06F 9/4411 719/327 |
| 2002/0152291 A1 * | 10/2002 | Fernandez .......... | G06F 9/44505 709/222 |
| 2011/0239047 A1 * | 9/2011 | Suwa ............... | G01R 31/31907 714/E11.02 |
| 2013/0111505 A1 * | 5/2013 | Frick ..................... | G06F 11/263 719/328 |
| 2014/0280898 A1 * | 9/2014 | Voit ........................ | H04L 47/83 709/224 |
| 2015/0046746 A1 * | 2/2015 | Messer ............... | G06F 11/0745 714/5.1 |
| 2016/0316043 A1 * | 10/2016 | Kochar ................... | H04L 67/53 |
| 2024/0329853 A1 * | 10/2024 | Cosby ................... | G06F 3/0689 |

* cited by examiner

*Primary Examiner* — Paul R. Myers
(74) *Attorney, Agent, or Firm* — Fogarty LLP (57) ABSTRACT

Embodiments of the present disclosure provide a system and method to abstract hardware access from applications running on a Baseboard Management Controller (BMC) using a hardware API service. According to one embodiment, an Information Handling System (IHS) includes executable instructions to expose an Application Program Interface (API) including a plurality of labels each uniquely identifying one of the hardware devices and a function to be provided by the one hardware device, and when an application executed on the BMC calls one of the labels, communicate with at least the one hardware device to perform the function specified by the one label.

20 Claims, 6 Drawing Sheets

SYSTEMS AND METHODS TO ABSTRACT HARDWARE ACCESS IN BASEBOARD MANAGEMENT CONTROLLERS (BMCS)

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Modern day IHS administrative management is often provided via baseboard management controllers (BMCs). The baseboard management controller (BMC) generally includes a specialized microcontroller embedded in the IHS, and may provide an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of the system. The administrator can also remotely communicate with the BMC to take certain corrective actions, such as resetting or power cycling the system to get a hung O/S running again. These abilities can often save on the total cost of ownership of an IHS, particularly when implemented in large clusters, such as server farms.

SUMMARY

Embodiments of the present disclosure provide a system and method to abstract hardware access from applications running on a Baseboard Management Controller (BMC) using a hardware API service. According to one embodiment, an Information Handling System (IHS) includes executable instructions to expose an Application Program Interface (API) including a plurality of labels each uniquely identifying one of the hardware devices and a function to be provided by the one hardware device, and when an application executed on the BMC calls one of the labels, communicate with at least the one hardware device to perform the function specified by the one label.

According to another embodiment, a hardware abstraction method for a BMC includes the steps of exposing an Application Program Interface (API) including multiple labels each uniquely identifying one hardware device of an Information Handling System (IHS) and a function to be provided by at least one hardware device, and when an application executed on the BMC calls one of the labels, communicating with at least the one hardware device to perform the function specified by the one label.

According to yet another embodiment, a memory storage device is configured with program instructions stored thereon that, upon execution by one or more processors of a client Information Handling System (IHS), cause the client IHS to expose an Application Program Interface (API) including multiple labels each uniquely identifying one of the hardware devices and a function to be provided by the one hardware device, and when an application executed on the BMC calls one of the labels, communicate with at least the one hardware device to perform the function specified by the one label.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard specifications, such as the Intelligent Platform Management Interface (BMC) and Systems Management Architecture of Server Hardware (SMASH) for computer system administration. The BMC (also referred to as a remote access controller) may include a processor, memory, and an out-of-band network interface separate from and physically isolated from an in-band network interface of the IHS, and/or other embedded resources. In certain embodiments, the BMC may include or may be part of a BMC (e.g., a DELL Remote Access Controller (DRAC) or an Integrated DRAC (iDRAC)).

The BMC firmware is normally proprietary and is often developed by the vendor and shipped along with the BMC to the end user. Nevertheless, industry trends have migrated toward custom BMC firmware stacks (e.g., operating systems) that allow the end user greater control over how the BMC operates. OpenBMC is one example standard under which custom BMC firmware stacks may be generated. In general, openBMC is a collaborative open-source Linux distribution for BMCs meant to work across heterogeneous systems that include enterprise, high-performance computing (HPC), telecommunications, and cloud-scale data centers.

Advances in BMC design has led to the development of an Inter-Process Communication (IPC) and remote procedure call (RPC) mechanism, such as Desktop Bus (D-Bus), which typically operate outside the operating-system space. D-Bus is usually provided as a "daemon" process that functions in the background to effectively facilitate exchange of IPC messages between processes that provide various services. Implementation of D-Bus in BMCs are advantageous in that it provides for abstraction of invoking interfaces of a service and responding to interface invocations. Thus, the service may be shielded from, among other things, serialization and deserialization of data shared with other services, thus yielding portable services that may be easily migrated from one platform to another. Because D-Bus is a standard feature provided by the openBMC platform, it may be beneficial to re-use established services on other platforms, such as vendor-based platforms, such as Open Server Manager (OMS) provided by DELL TECHNOLOGIES and vice-versa.

Nevertheless, while implementation of D-Bus in BMCs may provide enhanced manageability, transparency, and customization, its implementation has not been without drawbacks. For example, ongoing updates to the hardware devices in a BMC often require a corresponding update of interface routines used to access those hardware devices. Hardware devices of different types (e.g., CPLD, GPIO, i2c, etc.), are typically each accessed using their own unique protocol, which often results in hardware specific code in applications running in the BMC. Such a development methodology of continually updating applications is not scalable. Additionally, porting new chipsets/hardware (e.g., Aspeed, ARM, powerpc, etc.) to a BMC platform is often a difficult endeavor because each chipset handles hardware devices differently. New chipsets typically require a rewrite of applications running on the BMC. Additionally, a new hardware addition to the BMC platform may require some, most, or all applications running on the BMC to replicate the same code to access that new hardware. Each hardware type may also have its own API, which would be cumbersome to deal with over time when more device types and protocols are added.

The openBMC platform specifies the use of an entity manager service to manage the varying types of hardware devices configured on a BMC. However, a device type and its hardware access needs to be explicitly specified in Entity Manager for each hardware device managed by the BMC.

The services that the entity manager manages may also require changes on every chipset that is supported and is thus may not be easily scalable. As will be described in detail herein below, embodiments of the present disclosure provide systems and methods to abstract hardware access in Baseboard Management Controllers (BMCs) using a hardware API service. Using the hardware API service, updating hardware as well as firmware components of BMCs may be easily scaled by merely updating information associated with a new device rather than requiring an update to the applications that are to use the new hardware.

Figure 1A:
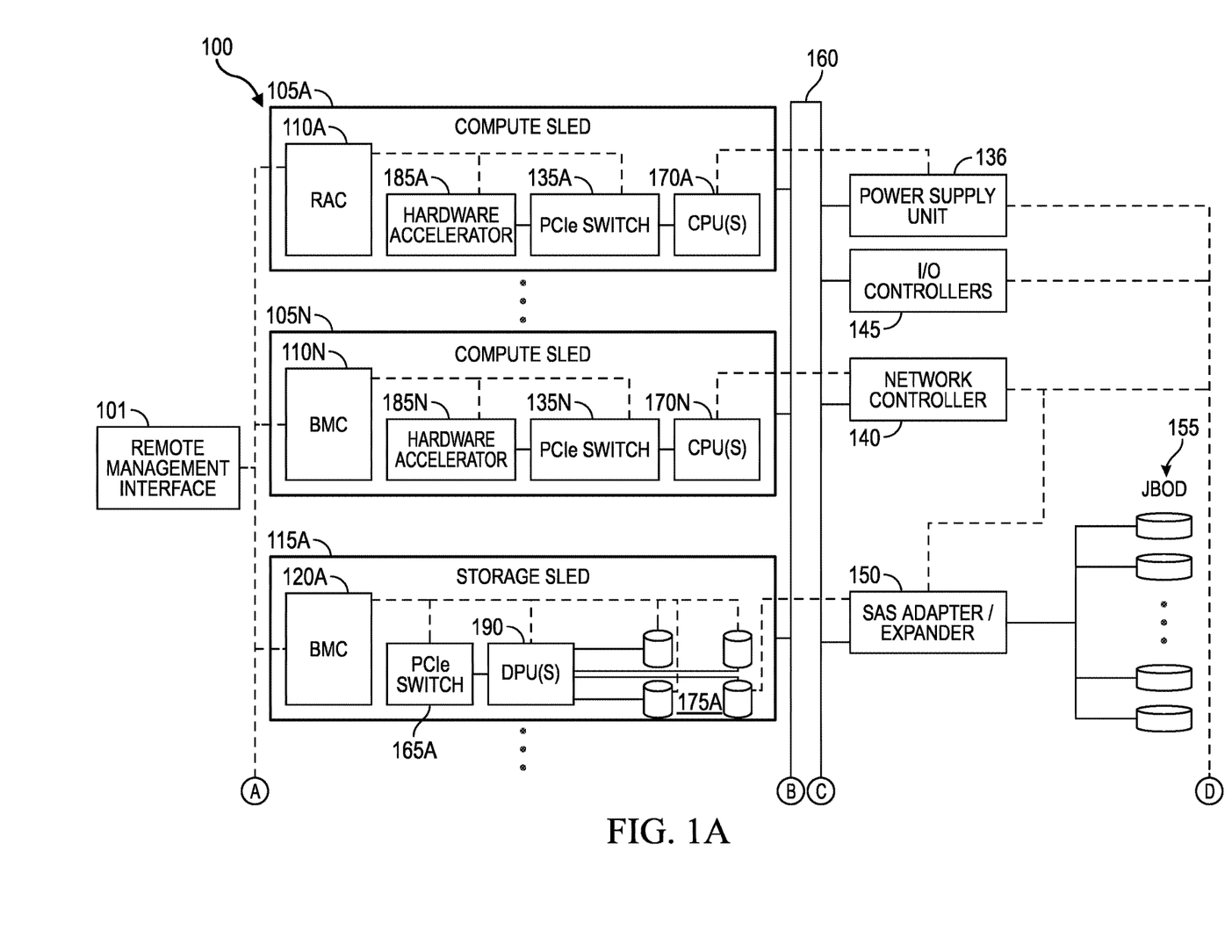
FIGS. 1A and 1B illustrates certain components of a chassis comprising one or more compute sleds and one or more storage sleds that may be configured to implement the systems and methods described according to one embodiment of the present disclosure.
Figure 1B:
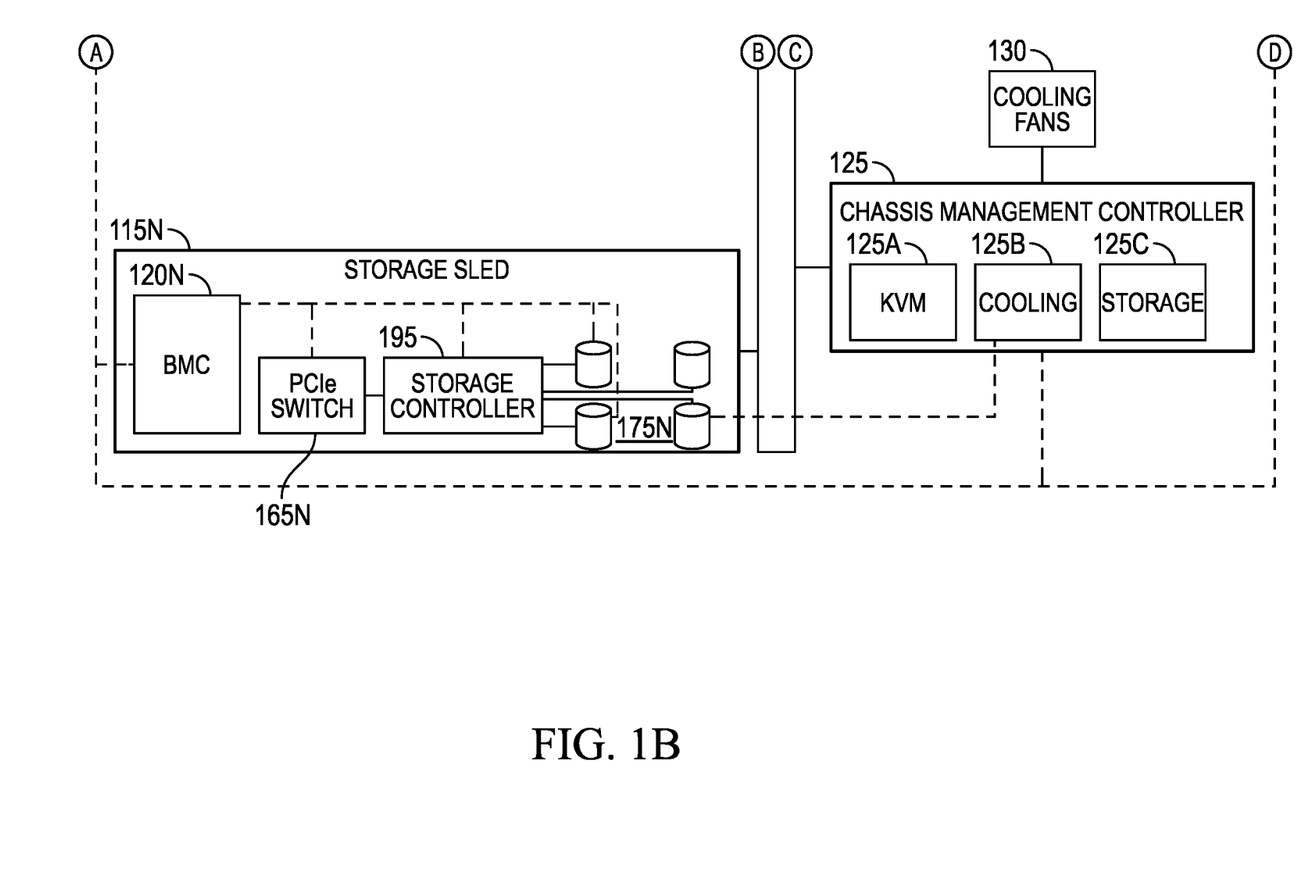

FIG. 1 is a block diagram illustrating certain components of a chassis 100 comprising one or more compute sleds 105*a-n* and one or more storage sleds 115*a-n* that may be configured to implement the systems and methods described according to one embodiment of the present disclosure. Embodiments of chassis 100 may include a wide variety of hardware configurations in which one or more sleds 105*a-n*, 115*a-n* are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removable sleds 105*a-n*, 115*a-n* that are installed in the chassis. In addition, once the chassis 100 has been deployed, firmware used by individual hardware components of the sleds 105*a-n*, 115*a-n*, or by other hardware components of chassis 100, may be modified in order to update the operations that are supported by these hardware components.

Chassis 100 may include one or more bays that each receive an individual sled (that may be additionally or alternatively referred to as a tray, blade, and/or node), such as compute sleds 105*a-n* and storage sleds 115*a-n*. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with diverse types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power, and network bandwidth, to be shared by the compute sleds 105*a-n* and storage sleds 115*a-n*, thus providing efficiency improvements and supporting greater computational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135*a-n*, 165a-n installed in the sleds 105a-n, 115a-n of the chassis. These high-speed data links may be used to support algorithm implementations that span multiple processing, networking, and storage components of an IHS and/or chassis 100. For instance, computational tasks may be delegated to a specific processing component of an IHS, such as to a hardware accelerator 185a-n that may include one or more programmable processors that operate separate from the main CPUs 170a-n of computing sleds 105a-n. In various embodiments, such hardware accelerators 185a-n may include DPUs (Data Processing Units), GPUs (Graphics Processing Units), SmartNICs (Smart Network Interface Card) and/or FPGAs (Field Programmable Gate Arrays). These hardware accelerators 185a-n operate according to firmware instructions that may be occasionally updated, such as to adapt the capabilities of the respective hardware accelerators 185a-n to specific computing tasks.

Chassis 100 may be installed within a rack structure that provides at least a portion of the cooling utilized by the sleds 105a-n, 115a-n installed in chassis 100. In supporting airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105a-n, 115a-n installed within the chassis. In this manner, a rack and a chassis 100 installed within the rack may utilize various configurations and combinations of cooling fans 130 to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105a-n, 115a-n to backplane 160 include PCIe couplings that support high-speed data links with the sleds 105a-n, 115a-n. In various embodiments, backplane 160 may support diverse types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 136.

Figure 2:
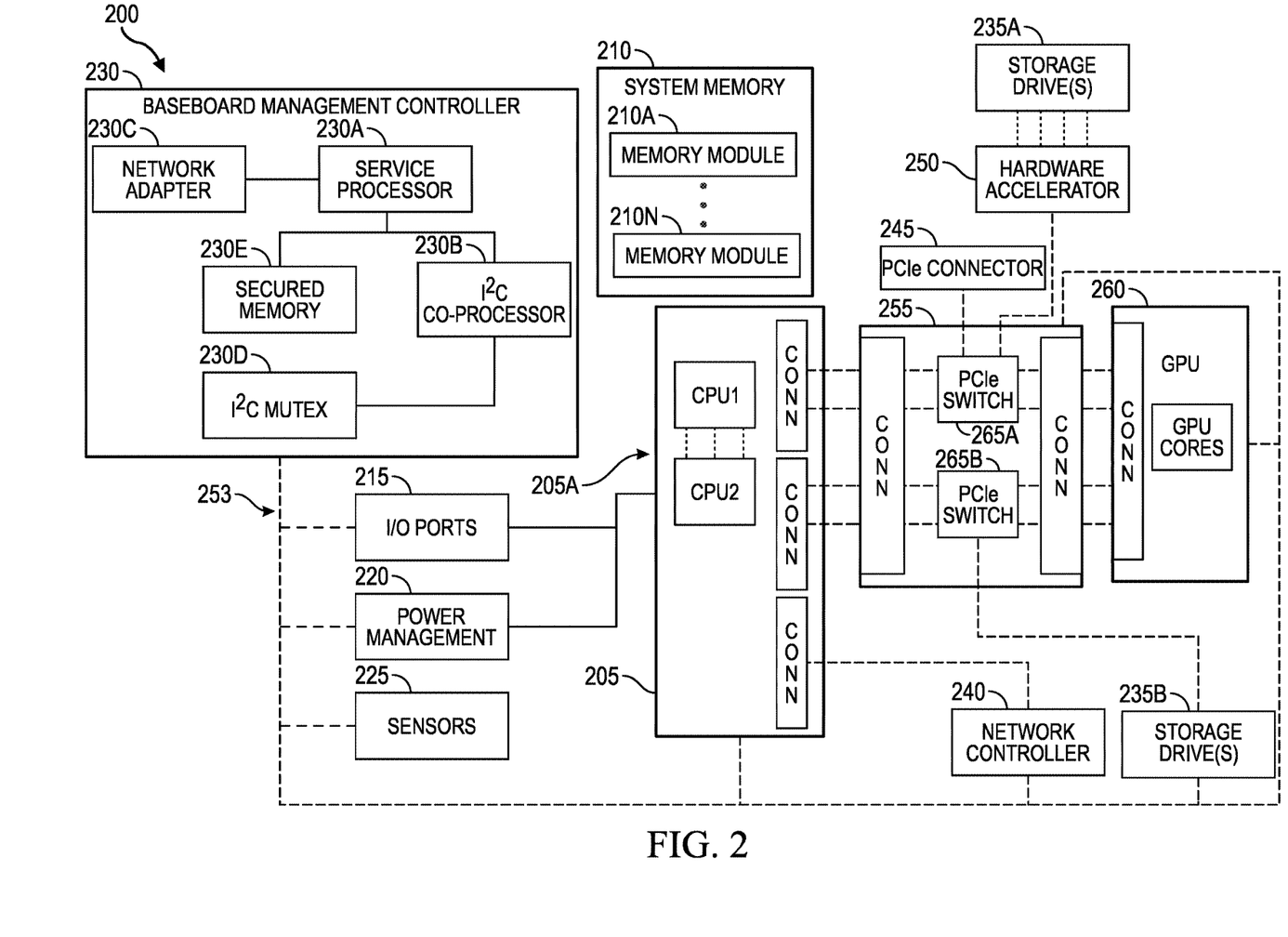
FIG. 2 illustrates an example of an IHS configured to implement systems and methods described herein according to one embodiment of the present disclosure.

In certain embodiments, each individual sled 105a-n, 115a-n-n may be an IHS such as described with regard to IHS 200 of FIG. 2. Sleds 105a-n, 115a-n may individually or collectively provide computational processing resources that may be used to support a variety of e-commerce, multimedia, business, and scientific computing applications, such as artificial intelligence systems provided via cloud computing implementations. Sleds 105a-n, 115a-n are typically configured with hardware and software that provide leading-edge computational capabilities. Accordingly, services that are provided using such computing capabilities are typically provided as high-availability systems that operate with minimum downtime.

In high-availability computing systems, such as may be implemented using embodiments of chassis 100, any downtime that can be avoided is preferred. As described above, firmware updates are expected in the administration and operation of data centers, but it is preferable to avoid any downtime in making such firmware updates. For instance, in updating the firmware of the individual hardware components of the chassis 100, it is preferable that such updates can be made without having to reboot the chassis. As described in additional detail below, it is also preferable that updates to the firmware of individual hardware components of sleds 105a-n, 115a-n be likewise made without having to reboot the respective sled of the hardware component that is being updated.

As illustrated, each sled 105a-n, 115a-n includes a respective BMC 110a-n, 120a-n. As described in additional detail with regard to FIG. 2, BMC 110a-n, 120a-n provides capabilities for remote monitoring and management of a respective sled 105a-n, 115a-n and/or of chassis 100. In support of these monitoring and management functions, BMC s 110a-n may utilize both in-band and sideband (i.e., out-of-band) communications with various managed components of a respective sled 105a-n and chassis 100. BMC s 110a-n, 120a-n may collect diverse types of sensor data, such as collecting temperature sensor readings that are used in support of airflow cooling of the chassis 100 and the sleds 105a-n, 115a-n. In addition, each BMC 110a-n, 120a-n may implement various monitoring and administrative functions related to a respective sled 105a-n, 115a-n, where these functions may be implemented using sideband bus connections with various internal components of the chassis 100 and of the respective sleds 105a-n, 115a-n. As described in additional detail below, in various embodiments, these capabilities of the BMC s 110a-n, 120a-n may be utilized in updating the firmware of hardware components of chassis 100 and/or of hardware components of the sleds 105a-n, 115a-n, without having to reboot the chassis or any of the sleds 105a-n, 115a-n.

The BMC s 110a-n, 120a-n that are present in chassis 100 may support secure connections with a remote management interface 101. In some embodiments, remote management interface 101 provides a remote administrator with various capabilities for remotely administering the operation of an HIS 200, including initiating updates to the firmware used by hardware components installed in the chassis 100. For example, remote management interface 101 may provide capabilities by which an administrator can initiate updates to all of the storage drives 175a-n installed in a chassis 100, or to all of the storage drives 175a-n of a particular model or manufacturer. In some instances, remote management interface 101 may include an inventory of the hardware, software, and firmware of chassis 100 that is being remotely managed through the operation of the BMC s 110a-n, 120a-n. The remote management interface 101 may also include various monitoring interfaces for evaluating telemetry data collected by the BMC s 110a-n, 120a-n. In some embodiments, remote management interface 101 may communicate with BMC s 110a-n, 120a-n via a protocol such the Redfish remote management interface.

In the illustrated embodiment, chassis 100 includes one or more compute sleds 105a-n that are coupled to the backplane 160 and installed within one or more bays or slots of chassis 100. Each of the individual compute sleds 105a-n may be an IHS, such as described with regard to FIG. 2.

Each of the individual compute sleds 105a-n may include various different numbers and types of processors that may be adapted to performing specific computing tasks. In the illustrated embodiment, each of the compute sleds 105a-n includes a PCIe switch 135a-n that provides access to a hardware accelerator 185a-n, such as the described DPUs, GPUs, Smart NICs and FPGAs, which may be programmed and adapted for specific computing tasks, such as to support machine learning or other artificial intelligence systems. As described in additional detail below, compute sleds 105a-n may include a variety of hardware components, such as hardware accelerator 185a-n and PCIe switches 135a-n, that operate using firmware that may be occasionally updated.

As illustrated, chassis 100 includes one or more storage sleds 115a-n that are coupled to the backplane 160 and installed within one or more bays of chassis 100 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple solid-state drives (SSDs) 175a-n, where the individual storage drives 175a-n may be accessed through a PCIe switch 165a-n of the respective storage sled 115a-n.

As illustrated, a storage sled 115a may include one or more DPUs (Data Processing Units) 190 that provide access to and manage the operations of the storage drives 175a of the storage sled 115a. Use of a DPU 190 in this manner provides low-latency and high-bandwidth access to numerous SSDs 175a. These SSDs 175a may be utilized in parallel through NVMe transmissions that are supported by the PCIe switch 165a that connects the SSDs 175a to the DPU 190. In some instances, PCIe switch 165a may be an integrated component of a DPU 190. The immense data storage and retrieval capabilities provided by such storage sled 115a implementations may be harnessed by offloading storage operations directed as storage drives 175a to a DPU 190a, and thus without relying on the main CPU of the storage sled, or of any other component of chassis 100. As indicated in FIG. 1, chassis 100 may also include one or more storage sleds 115n that provide access to storage drives 175n via a storage controller 195. In some embodiments, storage controller 195 may provide support for RAID (Redundant Array of Independent Disks) configurations of logical and physical storage drives, such as storage drives provided by storage sled 115n. In some embodiments, storage controller 195 may be a HBA (Host Bus Adapter) that provides more limited capabilities in accessing storage drives 175n.

In addition to the data storage capabilities provided by storage sleds 115a-n, chassis 100 may provide access to other storage resources that may be installed components of chassis 100 and/or may be installed elsewhere within a rack that houses the chassis 100. In certain scenarios, such storage drives 155 may be accessed via a SAS expander 150 that is coupled to the backplane 160 of the chassis 100. The SAS expander 150 may support connections to a number of JBOD (Just a Bunch of Disks) storage drives 155 that, in some instances, may be configured and managed individually and without implementing data redundancy across the various drives 155. The additional storage drives 155 may also be at various other locations within a datacenter in which chassis 100 is installed.

In light of the various manners in which storage drives 175a-n, 155 may be coupled to chassis 100, a wide variety of different storage topologies may be supported. Through these supported topologies, storage drives 175a-n, 155 may be logically organized into clusters or other groupings that may be collectively tasked and managed. In some instances, a chassis 100 may include numerous storage drives 175a-n, 155 that are identical, or nearly identical, such as arrays of SSDs of the same manufacturer and model. Accordingly, any firmware updates to storage drives 175a-n, 155 require the updates to be applied within each of these topologies being supported by the chassis 100. Despite the substantial number of different storage drive topologies that may be supported by an individual chassis 100, the firmware used by each of these storage devices 175a-n, 155 may be occasionally updated. In some instances, firmware updates may be limited to a single storage drive, but in other instances, firmware updates may be initiated for a large number of storage drives, such as for all SSDs installed in chassis 100.

As illustrated, the chassis 100 of FIG. 1 includes a network controller 140 that provides network access to the sleds 105a-n, 115a-n installed within the chassis. Network controller 140 may include various switches, adapters, controllers, and couplings used to connect chassis 100 to a network, either directly or via additional networking components and connections provided via a rack in which chassis 100 is installed. Network controller 140 operates according to firmware instructions that may be occasionally updated.

Chassis 100 may similarly include a power supply unit 136 that provides the components of the chassis with various levels of DC power from an AC power source or from power delivered via a power system provided by a rack within which chassis 100 may be installed. In certain embodiments, power supply unit 136 may be implemented within a sled that may provide chassis 100 with redundant, hot-swappable power supply units. Power supply unit 136 may operate according to firmware instructions that may be occasionally updated.

Chassis 100 may also include various I/O controllers 145 that may support various I/O ports, such as USB ports that may be used to support keyboard and mouse inputs and/or video display capabilities. Each of the I/O controllers 145 may operate according to firmware instructions that may be occasionally updated. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power supply unit 136, network controller 140 and airflow cooling fans 130 that are available via the chassis 100. As described, the airflow cooling fans 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein according to one embodiment of the present disclosure. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105*a-n*, 115*a-n*, or other type of server, such as an 1 RU server installed within a 2 RU chassis, which is configured to share infrastructure resources provided within a chassis 100.

IHS 200 may utilize one or more system processors 205, that may be referred to as CPUs (central processing units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus. The system memory 210 is coupled to CPUs 205 via one or more memory buses 205*a* that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210*a-n*. Each of the removable memory modules 210*a-n* may correspond to a printed circuit board memory socket that receives a removable memory module 210*a-n*, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to diverse types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line buses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the HIS 200. Upon powering or restarting IHS 200, CPUs 205 may utilize BIOS instructions to initialize and test hardware components coupled to the HIS 200, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the BMC 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of HIS 200, such as the BIOS and boot loader of IHS 200. These calculated hash values may then be compared against reference hash values that were previously stored in a secure non-volatile memory of the HIS 200, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated.

As indicated in FIG. 2, in some embodiments, CPUs 205 may be coupled to a PCIe card 255 that includes two PCIe switches 265a-b that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265a-b, different embodiments may operate using different numbers of CPUs and PCIe switches. In addition to serving as I/O controllers that route PCIe traffic, PCIe switches 265a-b include switching logic that can be used to expand the number of PCIe connections that are supported by CPUs 205. PCIe switches 265a-b may multiply the number of PCIe lanes available to CPUs 205, thus allowing more PCIe devices to be connected to CPUs 205, and for the available PCIe bandwidth to be allocated with greater granularity. Each of the PCIe switches 265a-b may operate according to firmware instructions that may be occasionally updated.

Using the available PCIe lanes, the PCIe switches 265a-b may be used to implement a PCIe switch fabric. Also through this switch fabric, PCIe NVMe (Non-Volatile Memory Express) transmission may be supported and utilized in high-speed communications with SSDs, such as storage drives 235a-b, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235a-b in various topologies, in the same manner as described with regard to the chassis 100 of FIG. 1. In the illustrated embodiment, storage drives 235a are accessed via a hardware accelerator 250, while storage drives 235b are accessed directly via PCIe switch 265b. In some embodiments, the storage drives 235a-b of IHS 200 may include a combination of both SSD and magnetic disk storage drives. In other embodiments, all of the storage drives 235a-b of IHS 200 may be identical, or nearly identical. In all embodiments, storage drives 235a-b operate according to firmware instructions that may be occasionally updated.

As illustrated, PCIe switch 265a is coupled via a PCIe link to a hardware accelerator 250, such as a DPU, Smart-NIC, GPU and/or FPGA, that may be a connected to the HIS 200 via a removable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, which may be used to implement functions used to support devices coupled to the IHS 200. In some embodiments, the processing cores of hardware accelerator 250 include ARM (advanced RISC (reduced instruction set computing) machine) processing cores. In other embodiments, the cores of the DPUs may include MIPS (microprocessor without interlocked pipeline stages) cores, RISC-V cores, or CISC (complex instruction set computing) (i.e., x86) cores. Hardware accelerator may operate according to firmware instructions that may be occasionally updated.

In the illustrated embodiment, the programmable capabilities of hardware accelerator 250 implement functions used to support storage drives 235a, such as SSDs. In such storage drive topologies, hardware accelerator 250 may implement processing of PCIe NVMe communications with storage drives 235a, thus supporting high-bandwidth connections with the storage drives. Hardware accelerator 250 may also include one or more memory devices used to store program instructions executed by the processing cores and/or used to support the operation of storage drives 235a such as in implementing cache memories and buffers utilized in support of high-speed operation of these storage drives, and in some cases may be used to provide high-availability and high-throughput implementations of the read, write and other I/O operations that are supported by these storage drives 235a. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions.

As illustrated in FIG. 2, PCIe switches 265a-b may also support PCIe couplings with one or more GPUs (Graphics Processing Units) 260. Embodiments may include one or more GPU cards, where each GPU card is coupled to one or more of the PCIe switches 265a-b, and where each GPU card may include one or more GPUs 260. In some embodiments, PCIe switches 265a-b may transfer instructions and data for generating video images by the GPUs 260 to and from CPUs 205. Accordingly, GPUs 260 may include one or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs may be utilized as programmable computing resources for offloading other functions from CPUs 205, in the same manner as hardware accelerator 250. GPUs 260 may operate according to firmware instructions that may be occasionally updated.

As illustrated in FIG. 2, PCIe switches 265a-b may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to HIS 200. Through couplings to PCIe connectors 245, a variety of data storage devices, graphics processors and network interface cards may be coupled to IHS 200, thus supporting a wide variety of topologies of devices that may be coupled to the IHS 200.

As described, IHS 200 includes a BMC 230 that supports remote management of IHS 200 and of various internal components of IHS 200. In certain embodiments, BMC 230 may operate from a different power plane from the processors 205 and other components of IHS 200, thus allowing the BMC 230 to operate, and management tasks to proceed, while the processing cores of IHS 200 are powered off. Various functions provided by the BIOS, including launching the operating system of the IHS 200, and/or functions of a TPM may be implemented or supplemented by the BMC 230. In some embodiments, the BMC 230 may perform various functions to verify the integrity of the IHS 200 and its hardware components prior to initialization of the operating system of IHS 200 (i.e., in a bare-metal state). In some embodiments, certain operations of the BMC 230, such as the operations described herein for updating firmware used by managed hardware components of IHS 200, may operate using validated instructions, and thus within the root of trust of IHS 200.

In some embodiments, BMC 230 may include a service processor 230*a*, or specialized microcontroller, which operates management software that supports remote monitoring and administration of IHS 200. The management operations supported by BMC 230 may be remotely initiated, updated, and monitored via a remote management interface 101, such as described with regard to FIG. 1. BMC 230 may be installed on the motherboard of IHS 200 or may be coupled to IHS 200 via an expansion slot or other connector provided by the motherboard. In some instances, the management functions of the BMC 230 may utilize information collected by various managed sensors 225 located within the IHS. For instance, temperature data collected by sensors 225 may be utilized by the BMC 230 in support of closed-loop airflow cooling of the IHS 200. As indicated, BMC 230 may include a secured memory 230*e* for exclusive use by the BMC in support of management operations.

In some embodiments, BMC 230 may implement monitoring and management operations using MCTP (Management Component Transport Protocol) messages that may be communicated to managed devices 205, 235*a-b*, 240, 250, 255, 260 via management connections supported by a sideband bus 253. In some embodiments, the BMC 230 may additionally or alternatively use MCTP messaging to transmit Vendor Defined Messages (VDMs) via the in-line PCIe switch fabric supported by PCIe switches 265*a-b*. In some instances, the sideband management connections supported by BMC 230 may include PLDM (Platform Level Data Model) management communications with the managed devices 205, 235*a-b*, 240, 250, 255, 260 of IHS 200.

As illustrated, BMC 230 may include a network adapter 230*c* that provides the BMC with network access that is separate from the network controller 240 utilized by other hardware components of the IHS 200. Through secure connections supported by network adapter 230*c*, BMC 230 communicates management information with remote management interface 101. In support of remote monitoring functions, network adapter 230*c* may support connections between BMC 230 and external management tools using wired and/or wireless network connections that operate using a variety of network technologies. As a non-limiting example of a BMC, the integrated Dell Remote Access Controller (iDRAC) from Dell® is embedded within Dell servers and provides functionality that helps information technology (IT) administrators deploy, update, monitor, and maintain servers remotely.

BMC 230 supports monitoring and administration of the managed devices of an IHS via a sideband bus interface 253. For instance, messages utilized in device and/or system management may be transmitted using I2C sideband bus 253 connections that may be individually established with each of the respective managed devices 205, 235*a-b*, 240, 250, 255, 260 of the IHS 200 through the operation of an I2C multiplexer 230*d* of the BMC. As illustrated in FIG. 2, the managed devices 205, 235*a-b*, 240, 250, 255, 260 of IHS 200 are coupled to the CPUs 205, either directly or directly, via in-line buses that are separate from the I2C sideband bus 253 connections used by the BMC 230 for device management.

In certain embodiments, the service processor 230*a* of BMC 230 may rely on an I2C co-processor 230*b* to implement sideband I2C communications between the BMC 230 and the managed hardware components 205, 235*a-b*, 240, 250, 255, 260 of the IHS 200. The I2C co-processor 230*b* may be a specialized co-processor or microcontroller that is configured to implement an I2C bus interface used to support communications with managed hardware components 205, 235*a-b*, 240, 250, 255, 260 of HIS 200. In some embodiments, the I2C co-processor 230*b* may be an integrated circuit on the same die as the service processor 230*a*, such as a peripheral system-on-chip feature that may be provided by the service processor 230*a*. The sideband I2C bus 253 is illustrated as single line in FIG. 2. However, sideband bus 253 may be comprised of multiple signaling pathways, where each may be comprised of a clock line and data line that couple the BMC 230 to I2C endpoints 205, 235*a-b*, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
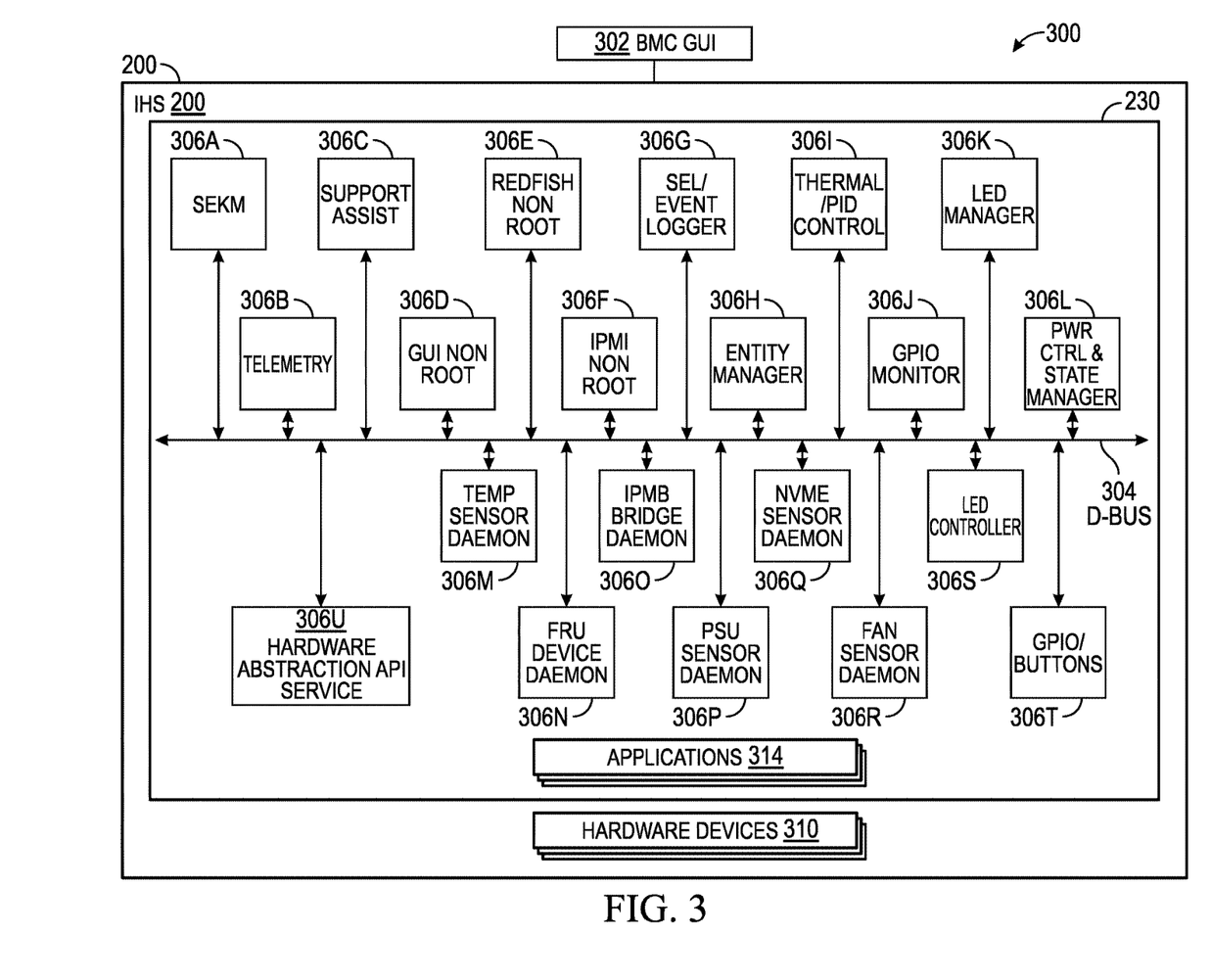
FIG. 3 illustrates several components of a hardware abstraction system that may be used to abstract hardware access in Baseboard Management Controllers (BMCs) according to one embodiment of the present disclosure.

FIG. 3 illustrates several components of a hardware abstraction system 300 that may be used to abstract hardware access in Baseboard Management Controllers (BMCs) according to one embodiment of the present disclosure. The hardware abstraction system 300 includes a BMC 230 that may be used to manage the operation of an IHS 200 using a BMC Graphical User Interface (GUI) 302. The BMC 230 is configured with a D-Bus layer 304 and multiple D-Bus services 306*a-u* (collectively 306) that communicate with one another through the D-Bus layer 304. The IHS 200 also includes multiple hardware devices 310 that may be managed by certain services 306 that use the D-Bus layer 304. Each of the hardware devices 310 may be any type, such as those described above with reference to FIGS. 1A-2. The IHS 200 may also include multiple sensors, which may be construed to be hardware devices 310 of the IHS 200 in that they are physical devices that can be accessed by the code running the in BMC 230.

According to embodiments of the present disclosure, the BMC 230 is configured with a hardware abstraction API service 306*u* that abstracts hardware access from the entity manager service 306*h* as well as other applications running on the BMC 230. Thus, updating hardware as well as firmware components to the BMC 230 may be easily scaled by merely updating information associated with a new device in the hardware abstraction API service 306*u* rather than performing an update on some, most, or all applications 314 that are to use the new hardware.

The hardware abstraction API service 306*u* may be accessed by one or more applications 314 configured on the BMC 230 and/or other services 306 through the D-Bus 304 to utilize the features provided by the hardware abstraction API service 306*u*. For example, the entity manager service 306*h* or an application 314, such as the BMC firmware installed on the BMC 230 may use the hardware abstraction API service 306*u* to access the hardware devices 310 of the IHS 200. Other types of applications 314 may also utilize the hardware abstraction API service 306*u*. In one embodiment, the hardware abstraction API service 306*u* may leverage established applications that have been proven in over time such that a rewrite of the code used to access the hardware devices 310 through the D-Bus 304 may not be necessary. One such example of an application 314 may include a sensor infrastructure package that coordinates communication with some, most, or all sensors in the IHS 200 to manage the operation of the IHS 200. The hardware abstraction API service 306u may be consumed by the sensor infrastructure package application 314 by linking the hardware labels of the sensors in a Hardware Abstraction Layer (HAL) properties section of a sensor configuration portion of the sensor infrastructure package application 314.

The services 306 using the D-Bus 304 may be any suitable type. As shown, services 306 that use the D-Bus 304 may include a Secure Enterprise Key Manager (SEKM) module 306a, a telemetry module 306b, a support assist module 306c, a non-root GUI module 306d, a non-root redfish module 306e, an IPMI module 306f, a SEL/Event logger module 306g, an entity manager 306h, a thermal/PID control module 306i, a GPIO monitor 306j, a LED manager 306k, a power control and state manager 306l, a temp sensor daemon 306m, a Field Replaceable Unit (FRU) device daemon 306n, an IPMB bridge daemon 306o, a Power Supply Unit (PSU) sensor daemon 306p, an NVMe sensor daemon 306q, a fan sensor daemon 306r, an LED controller module 306s, and a GPIO/Buttons module 306t. It should be appreciated that other embodiments may have additional, fewer, or different services 306 than what is shown and described herein.

For the purposes of this disclosure, the term "BMC GUI" may refer broadly to systems that are configured to couple to a management controller, such as a BMC 230, and issue management instructions for an information handling system (e.g., computing device) that is being managed by the management controller. One example of such a system management console is the DELL OpenManage Enterprise (OME) systems management console. In various embodiments, management consoles may be implemented via specialized hardware and/or via software running on a standard information handling system. In one embodiment, a system management console may be deployed on a secure virtual machine (VM), such as a VMWARE Workstation appliance.

Figure 4:
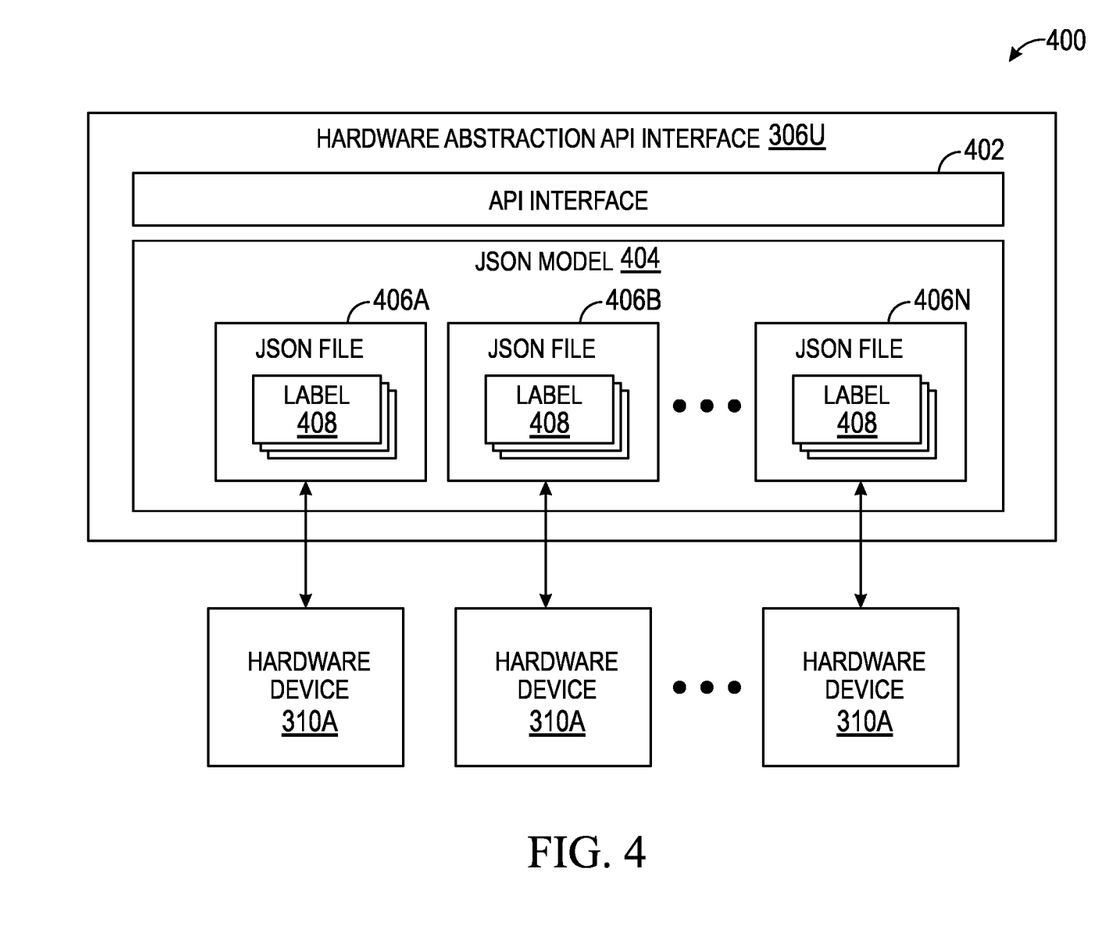
FIG. 4 illustrates several components of the hardware abstraction API service showing how it may abstract access to the hardware devices and sensors of the IHS according to one embodiment of the present disclosure.

FIG. 4 illustrates several components of the hardware abstraction API service 306u showing how it may abstract access to the hardware devices 310 of the IHS 200 according to one embodiment of the present disclosure. The hardware abstraction API service 306u is configured with an API interface 402 and a JSON model 404 with multiple JSON files 406a-n (collectively 406) for communicating (e.g., managing) the operation of the hardware devices 310 configured in the IHS 200. For example, when a new hardware device 310 is deployed in the IHS 200, a new JSON file 406 may be added to the JSON model 404 that includes detailed information about how to interface with the new hardware device 310. While the abstracted information used to communicate with or manage the operation of the hardware devices 310 are described herein as being a JSON model 404, it should be appreciated that any suitable type of logical architecture (e.g., MongoDB, ECMAscript, JAVA script, etc.) may be used to provide an abstracted interface for the hardware devices 310 of the HIS 200.

Each JSON file 406 may be configured with one or more labels 408 that are each unique to a function of the hardware device 310 associated with the JSON file 406. The applications 314 and/or services 306 can access the hardware devices 310 by the label 408 while the details of its associated function are abstracted from them. Say for instance, an application 314 and/or service 306 needs to know a presence status of the first processor (e.g., processor 1) of a multi-core processor of the IHS 200, a label 408 named "CPU1_PRESENCE" may be created and the definitions of accessing the first processor to detect its presence would be defined in it.

The API interface 402 includes logic for receiving function requests from an application 314 using the labels 408, and communicating with each hardware device 310 using its native protocol to have the hardware device 310 perform that function. In one embodiment, the hardware abstraction API service 306u can also be extended for hardware devices 310 that use specific access protocols, such as Power Management Bus (PMBUS), Management Component Transport Protocol (MCTP) and so on. For instance, the hardware abstraction API service 306u may be configured with code to communicate with hardware devices 310 over a PMBUS or MCTP using their native protocol.

It should be important to note that each JSON file 406, to access its associated hardware device 310 may communicate with other hardware devices 310 other than its associated hardware device 310 to obtain relevant information for interfacing with its associated hardware device 310. For example, if the presence is detected by pin number 1 of a GPIO hardware device 310, then the label 408 may be configured with information to interface with that GPIO hardware device 310 to access information about its associated CPU1 hardware device 310. As another example, if determining the presence status of the CPU1 would be a CPLD hardware device 310 of the BMC 230, then the detailed information associated with the CPU1_PRESENCE label 408 could be an offset bitmask of a status register outputted by the CPLD hardware device 310. As yet another example, if determining the presence status of the CPU1 would be a PECI driver hardware device 310 of the BMC 230, then the detailed information associated with the CPU1_PRESENCE label 408 could be driver information about the first processor. As yet another example, if determining the presence status of the CPU1 would be a I2C hardware device 310 of the BMC 230, then the detailed information associated with the CPU1_PRESENCE label 408 could be a bus number, address, and offset of the I2C hardware device 310 could be used.

In a like manner, some, most, or all hardware (e.g., hardware devices 310) and their functions may be abstracted from the applications 314 and/or the services 306 of the D-Bus 304. Such abstraction may be provided by definition of a hardware device 310, such as the hardware, what protocol to access, what parameters are used to access and a label 408 in the JSON file 406. Applications 314 and services 306 can use the label 408 to access different hardware, with one generalized API interface 402. This can be extended for all applications 314 and services 306 (e.g., entity manager 306h) that are provided with the labels 408 to access. Additionally, the hardware abstraction API service 306u can be extended as a Software Development Kit (SDK) pluggable model for other applications 314 running on the BMC 230. For example, the various features of the hardware abstraction API service 306u may be provided as a framework from which applications can be built or otherwise modified to communicate with the hardware devices 310 in a manner in which the details of the hardware access is abstracted from those applications.

Figure 5:
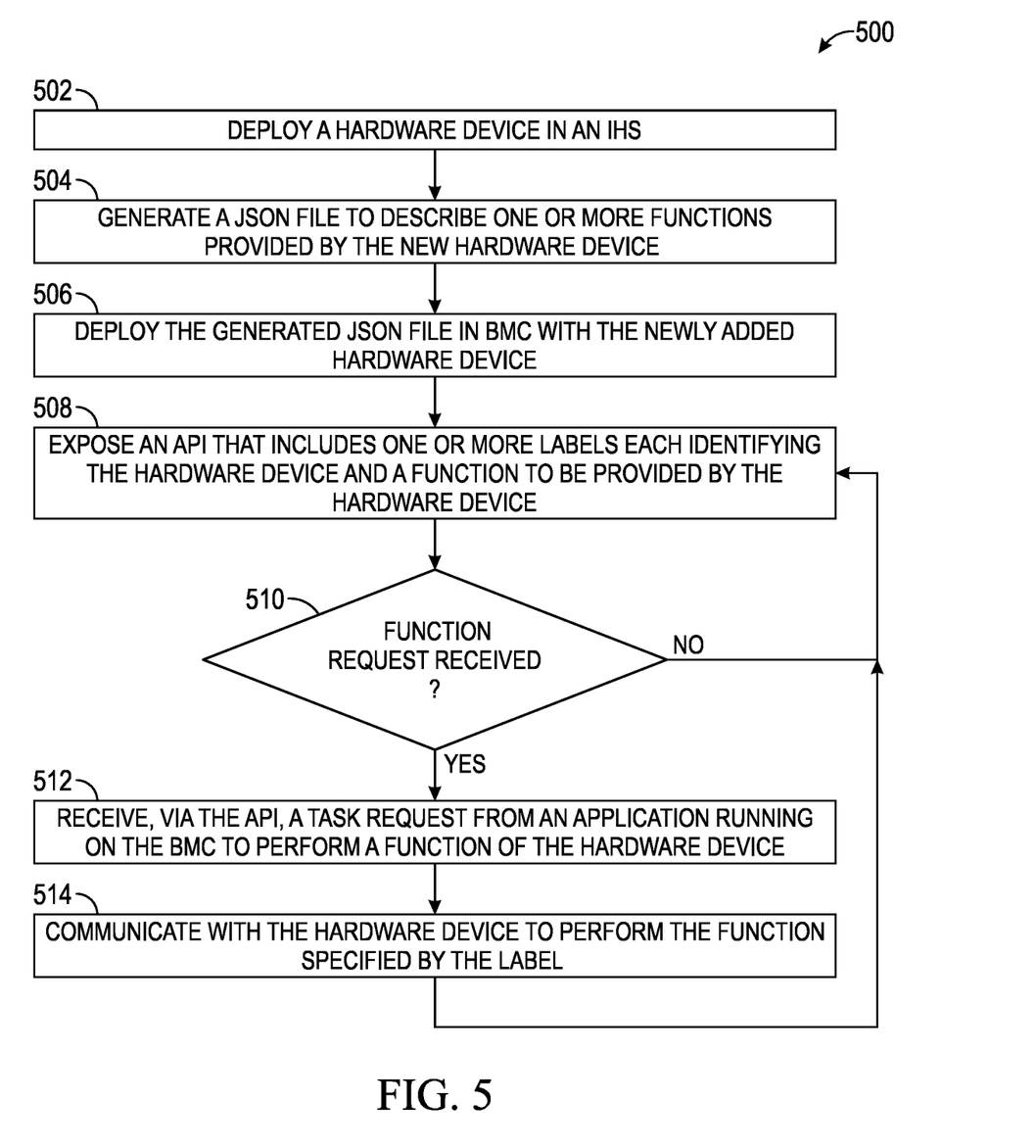
FIG. 5 illustrates an example hardware abstraction method showing how a hardware device may be deployed on a BMC and configured for use via the hardware abstraction API service according to one embodiment of the present disclosure.

FIG. 5 illustrates an example hardware abstraction method 500 showing how a hardware device 310 may be deployed on a BMC 230 and configured for use via the hardware abstraction API service 306u according to one embodiment of the present disclosure. Additionally or alternatively, the hardware abstraction method 500 may be performed in whole or in part, by the hardware abstraction system 300 as shown and described above with reference to FIG. 3. The hardware abstraction method 500 may be performed at any time, such as whenever a new hardware device 310 is to be deployed on an existing BMC 230, or whenever a new BMC 230 is to be deployed in which all of the hardware devices 310 are considered to be new.

Initially at step 502, the hardware abstraction method 500 deploys a hardware device 310 in an IHS 200. The hardware device 310 may be any type, such as those described above with reference to FIGS. 1A-2. In a particular embodiment, the hardware device 310 may be a sensor configured on the IHS 200, such as a temperature sensor, a presence sensor, a voltage sensor, and the like. Thereafter at step 504, the hardware abstraction method 500 generates a JSON file 404 to describe one or more functions provided by the new hardware device 310. For example, a JSON file 404, or other device description file, may be generated with one or more labels 408 each uniquely identifying the newly added hardware device 310 and a function to be provided by the newly added hardware device 310. The generated JSON file 404 is then deployed in the BMC 230 with the hardware device 310 at step 506.

At this point, the hardware abstraction system 300 is ready to begin processing function requests from applications 314 configured on the BMC 230. Thus at step 508, the hardware abstraction method 500 exposes an API that includes one or more labels 408 each uniquely identifying the hardware device 310 and a function to be provided by the hardware device 310. The hardware abstraction method 500 then waits for a function request to be received from an application 314 at step 510. If a function request is received, processing continues at step 512; otherwise, processing continues at step 508 to continue waiting for a function request message.

At step 512, the method 500 receives, via the API interface 402, a function request from an application 314 running on the BMC 230. In one embodiment, the application 314 may be the firmware of the BMC 230, a D-Bus-enabled service 306, or an entity manager service of an openBMC platform. Additionally, the application 314 may be a legacy application, such as a sensor infrastructure package that coordinates sensor information from multiple sensors 312 configured in the IHS 200. Within this disclosure, a legacy application may include any type of application that has been previously adopted for use in a BMC 230, such as one deployed in a previous version of the BMC 230.

At step 514, the hardware abstraction method 500 communicates with the hardware device 310 to perform the function specified by the label 408. For example, the API interface 402 may access the hardware information associated with the label 408 called by the application 314, and using the hardware information, communicate with the hardware device 310 to perform the specified function. In some embodiments, the hardware abstraction method 500 may communicate with other hardware devices 310 in the IHS 200 to perform the function specified by the called label 408. Given the example provided above, performing the function of identifying a presence status of the CPU hardware device may involve communicating with either a GPIO hardware device 310, a CPLD hardware device 310, a PECI hardware device 310, or an I2C hardware device 310 to identify the presence status of the CPU.

When the method 500 has communicated with the hardware device 310 to perform the function specified by the label 408, processing continues at step 508 to wait for additional function requests to be received from the same application 314 or a different application 314. Thus, the hardware abstraction method 500 is continually performed throughout the operation of the BMC 230 to process task requests from the applications 314 running on the BMC 230.

The aforedescribed process may be performed each time that it is needed or desired for the executable image 412 to be checked for authentic open source files 410. Nevertheless, when use of the hardware abstraction method 500 is no longer needed or desired, the hardware abstraction method 500 ends.

Although FIG. 5 describes an example method 500 that may be performed to abstract details of functions performed by the hardware devices 310 of an IHS 200 with applications 314 that use those hardware devices 310, the features of the disclosed processes may be embodied in other specific forms without deviating from the spirit and scope of the present disclosure. For example, certain steps of the disclosed method 500 may be performed sequentially, or alternatively, they may be performed concurrently. As another example, the method 500 may perform additional, fewer, or different operations than those operations as described in the present example. As yet another example, the steps of the processes described herein may be performed by a manual or executable process other than the BMC 230 or hardware abstraction system 300 as described above.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
a Baseboard Management Controller (BMC) comprising at least one processor and at least one memory coupled to the at least one processor, the at least one memory having program instructions stored thereon that, upon execution by the at least one processor, cause the BMC to:
expose an Application Program Interface (API) including a plurality of labels each uniquely identifying one of the hardware devices and a function to be provided by the one hardware device; and
when an application executed on the BMC calls one of the labels, communicate with at least the one hardware device to perform the function specified by the one label.

2. The IHS of claim 1, wherein the instructions, upon execution, cause the IHS to expose the API using a JSON model.

3. The IHS of claim 1, wherein the instructions, upon execution, cause the IHS to communicate with a second hardware device to perform the function specified by the one label on the one hardware device.

4. The IHS of claim 1, wherein the application comprises a firmware of the BMC.

5. The IHS of claim 1, wherein the application comprises a legacy application of the BMC.

6. The IHS of claim 5, wherein the legacy application comprises a sensor infrastructure package, and the hardware device comprises a sensor.

7. The IHS of claim 1, wherein the application comprises an entity manager service of a D-Bus-enabled openBMC firmware.

8. The IHS of claim 1, wherein the instructions, upon execution, cause the IHS to communicate with the one hardware device using at least one of a Power Management Bus (PMBUS) protocol or a Management Component Transport Protocol (MCTP).

9. The IHS of claim 1, wherein the instructions are provided as a Software Development Kit (SDK).

10. A hardware abstraction method for a BMC comprising:
exposing an Application Program Interface (API) including a plurality of labels each uniquely identifying one of a plurality of hardware devices of an Information Handling System (IHS) and a function to be provided by at least one hardware device; and
when an application executed on the BMC calls one of the labels, communicating with at least the one hardware device to perform the function specified by the one label.

11. The hardware abstraction method of claim 10, further comprising exposing the API using a JSON model.

12. The hardware abstraction method of claim 10, further comprising communicating with a second hardware device to perform the function specified by the one label on the one hardware device.

13. The hardware abstraction method of claim 10, wherein the application comprises at least one of a firmware of the BMC or an entity manager service of a D-Bus-enabled openBMC firmware.

14. The hardware abstraction method of claim 13, wherein the application comprises a sensor infrastructure package, and the hardware device comprises a sensor.

15. The hardware abstraction method of claim 10, further comprising communicating with the one hardware device using at least one of a Power Management Bus (PMBUS) protocol or a Management Component Transport Protocol (MCTP).

16. A memory storage device having program instructions stored thereon that, upon execution by one or more processors of a client Information Handling System (IHS), cause the client IHS to:
expose an Application Program Interface (API) including a plurality of labels each uniquely identifying one of the hardware devices and a function to be provided by the one hardware device; and
when an application executed on the BMC calls one of the labels, communicate with at least the one hardware device to perform the function specified by the one label.

17. The memory storage device of claim 15, wherein the instructions, upon execution, cause the IHS to expose the API using a JSON model.

18. The memory storage device of claim 15, wherein the instructions, upon execution, cause the IHS to communicate with a second hardware device to perform the function specified by the one label on the one hardware device.

19. The memory storage device of claim 15, wherein the application comprises at least one of a firmware of the BMC, a legacy application of the BMC, a sensor infrastructure package, or an entity manager service of a D-Bus-enabled openBMC firmware.

20. The memory storage device of claim 15, wherein the instructions, upon execution, cause the IHS to communicate with the one hardware device using at least one of a Power Management Bus (PMBUS) protocol or a Management Component Transport Protocol (MCTP).

* * * * *

UNITED STATES PATENT AND TRADEMARK OFFICE
CERTIFICATE OF CORRECTION

PATENT NO. : 12,423,204 B2
APPLICATION NO. : 18/493975
DATED : September 23, 2025
INVENTOR(S) : Anto DolphinJose Jesurajan Marystella et al.

It is certified that error appears in the above-identified patent and that said Letters Patent is hereby corrected as shown below:

In the Claims

In Column 20, Line 35, Claim 17 delete "17. The memory storage device of claim 15, wherein the" and insert -- 17. The memory storage device of claim 16, wherein the -- therefor.

In Column 20, Line 38, Claim 18 delete "18. The memory storage device of claim 15, wherein the" and insert -- 18. The memory storage device of claim 16, wherein the -- therefor.

In Column 20, Line 42, Claim 19 delete "19. The memory storage device of claim 15, wherein the" and insert -- 19. The memory storage device of claim 16, wherein the -- therefor.

In Column 20, Line 47, Claim 20 delete "20. The memory storage device of claim 15, wherein the" and insert -- 20. The memory storage device of claim 16, wherein the -- therefor.

Signed and Sealed this
Twenty-first Day of October, 2025

John A. Squires
*Director of the United States Patent and Trademark Office*